Figure 1:
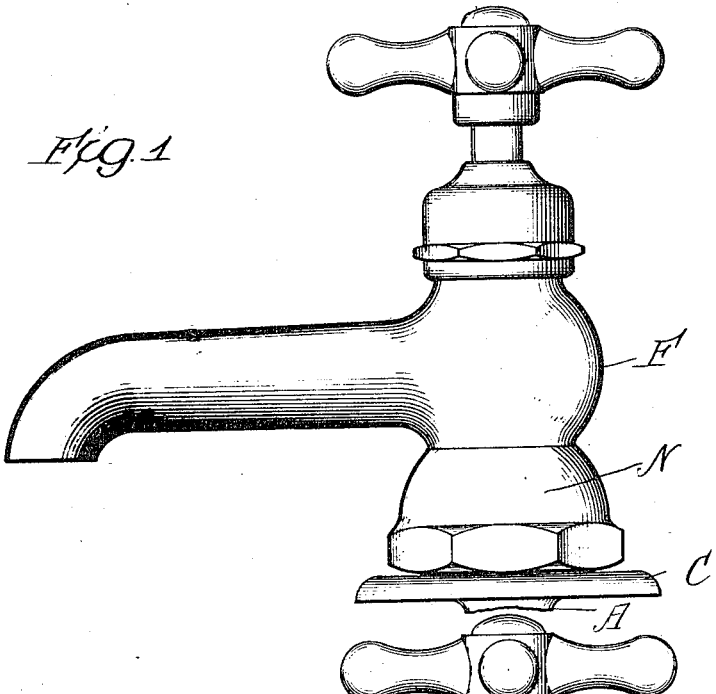
Figure 2:
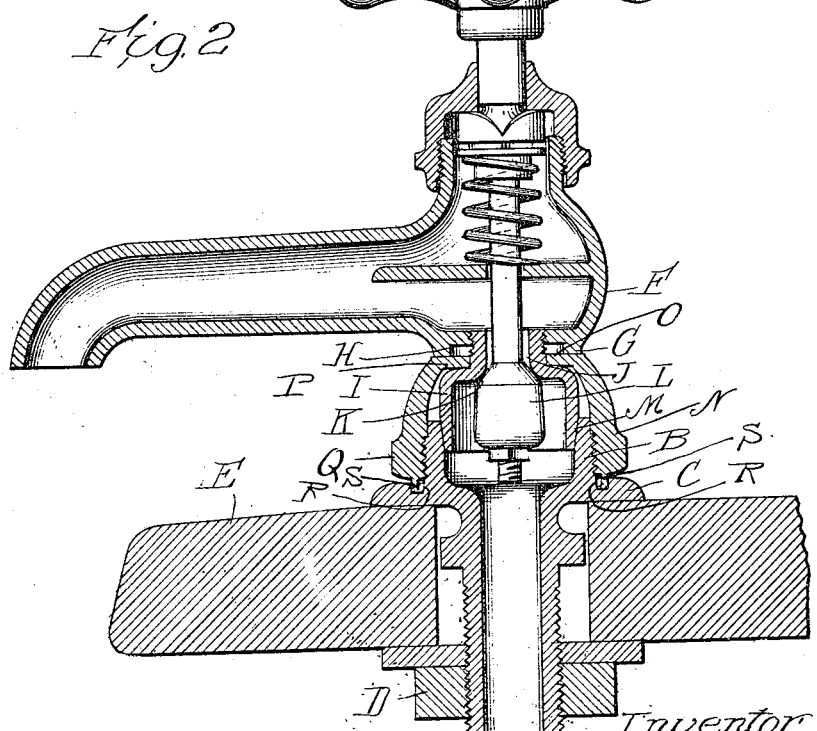

W. S. GRAHAM.
BASIN COCK.
APPLICATION FILED SEPT. 28, 1908.

962,083.

Patented June 21, 1910.

Witnesses:
R. A. White
Harry R. Lewlitz

Inventor
William Sydney Graham
By Rudolph Fox Atty.

UNITED STATES PATENT OFFICE.

WILLIAM SYDNEY GRAHAM, OF CHICAGO, ILLINOIS, ASSIGNOR TO FEDERAL-HUBER COMPANY, OF CHICAGO, ILLINOIS, A CORPORATION OF ILLINOIS.

BASIN-COCK.

962,083.

Specification of Letters Patent. Patented June 21, 1910.

Application filed September 28, 1908. Serial No. 455,176.

*To all whom it may concern:*

Be it known that I, WILLIAM SYDNEY GRAHAM, citizen of the United States, residing at Chicago, in the county of Cook and State of Illinois, have invented certain new and useful Improvements in Basin-Cocks; and I do hereby declare the following to be a full, clear, and exact description of the invention, such as will enable others skilled in the art to which it appertains to make and use the same.

This invention relates to a novel construction in a basin cock, the object being to provide a device of this character which is simple and efficient and provides certain advantages in case of adjustment and repair and in general appearance, and consists in the features of construction and combination of parts hereinafter fully described and claimed.

In the accompanying drawings illustrating my invention: Figure —1— is a side elevation of a basin cock constructed in accordance with my invention; Fig. —2— is a central vertical longitudinal section of the same.

The main object of my invention is to provide a basin cock which is of less height than ordinarily so that the nozzle or spout is disposed nearer the slab and to provide means whereby said cock is easily and quickly mounted and a fluid tight joint with the service pipe connecting member made, whereby greater strength, durability and rigidity besides a more balanced and ornamental appearance is imparted to the cock.

The invention consists substantially in the specific construction of the base portion of the cock and the delivery end portion of the service pipe connecting member whereby the objects of the invention are attained.

The pipe A connected at one end with the service pipe in the usual manner and which passes through the basin top is provided at its upper end with a flaring mouth bordered by an annular externally threaded flange B internally tapered at its upper end. The said pipe A is also provided with an annular flange C between which and the nut D the basin top E is engaged.

The body portion F of the cock is provided with a downwardly extending annular flange G concentric with a threaded opening in which the flange H of an inverted cup I is received. At the inlet end of central passage J the valve seat K is formed upon which the valve L seats. The larger flange M of said cup I is externally tapered and fits within the tapered mouth of the flange B of the pipe A, said tapered surfaces being adapted to form a fluid tight joint.

A cap nut or union member N is internally threaded at one end and engages the externally threaded flange B, said nut being tapered and provided at its upper end with an inwardly extending annular flange O which engages the shoulder P of the cup I, said flange O being loosely confined between the said shoulder P and the annular flange G of the body F of the cock. The said nut N serves to force the tapered end portion of the flange M of said cup I into the tapered mouth of the flange B, thereby not only forming a fluid tight joint but also serving to so securely engage said members with each other as to prevent relative rotation thereof except upon applying unusual force. The said nut N is provided at its lower end with an annular relatively heavy flange Q, which is peripherally cut away to form a hexagonal surface, and when said nut has been drawn down the requisite distance to properly secure the cup I and flange B together, said flange Q is almost in contact with said flange C. In order to prevent the threads of the flange B from being in view I provide in the flange C an annular groove R which receives the annular flange S on the lower end of the said nut N. Furthermore, the cock as it appears on the basin top is heaviest at the base, that is, it is well balanced and not top heavy. The greater diameter of the flange B than the pipe A also insures greater strength at the base of the cock than is usual in this class of fixtures, such strength and also rigidity of the cock being greatly increased by the interfitting tapered joint between the flange B and cup I, such wedging interfit being better adapted to resist separation besides being more easily effected than the usual ground joint to make the same fluid tight. Such tapered joint serves to reinforce the connection as will be obvious and increases the strength and rigidity thereof. Furthermore, advantages of the above construction, reside in the ease with which the cock may be mounted and removed and the direction of extension of the nozzle properly and accurately adjusted. It will also be noted that in order to replace the rubber valve L it is necessary only to remove the nut N and lift the whole cock whereupon said valve becomes easily accessible without necessitating disturbance of any of the operating mechanism.

I claim as my invention:

1. In a basin cock, a service-pipe connecting member passing through and secured to the basin-slab and projecting above the same, the projecting end portion being annularly enlarged and externally threaded, a cock or body-portion having a removable member secured thereto, said removable member being equipped with an annular shoulder between its ends, the lower end portion of said removable member and the projecting end portion of the service-pipe connecting member having tapering walls so as to permit the one to take within the other to a predetermined point, and a cap-nut freely rotatable relatively to and engaging said removable member and the projecting end portion of said service-pipe connecting member whereby the end of one member is wedged within the end of the other to form a fluid tight joint and secure said cock onto the service-pipe connecting member.

2. In a basin, a cock provided in its body portion with a threaded opening through which the valve stem passes, a member having a central externally threaded hollow projection entering and engaging said threaded opening, the said member being equipped with an annular shoulder between its ends, the lower end of said member portion being externally tapered, a service pipe connecting member passing through and secured to the slab, an annular externally threaded internally tapered flange at the delivery end of said connecting member, and a union member engaging the thread of said flange and engaging said annularly shouldered member to secure the latter to the former, the tapered portions thereof interfitting and co-acting to form a fluid tight joint.

3. A basin cock comprising a service pipe connecting member having an annularly enlarged externally threaded internally tapered mouth portion, an externally tapered member fitting said mouth portion, said last-named member being reduced between its ends to provide an annular shoulder thereon, and terminating at its other end in an externally threaded flange secured within a threaded opening in the body of the cock, and a union nut freely rotatable relatively to and engaging the annular shoulder of said last-named member and engaging said flange of said first-named member to couple said members.

4. A basin-cock provided with a valve and a downwardly projecting flaring member within which the valve seats, a union member adapted to take over said downwardly projecting member and loosely engage therewith, in combination with a service-pipe connecting member with which the flared end of the downwardly projecting member engages, the upper end of said connecting member taking within the union member and engaging therewith.

5. A basin-cock provided with a valve and having a downwardly projecting angular member tapering at its lower end, within which the valve seats, a union member adapted to take over the angular member and engage thereon, in combination with a service-pipe connecting member having an internally tapered upper end within which the angular member takes, said connecting member being removably connected to the lower end of the union member.

6. A basin-cock provided with a valve and a removable downwardly flaring member within which the valve seats, a service-pipe connecting member adapted to receive the flared end of said flaring member, and a union member taking over said flaring member and adapted to engage with the connecting member, whereby the relation between the flaring member and connecting member is controlled.

7. A basin-cock provided with a valve and a removable downwardly projecting flaring member within which the valve seats, a union member loosely engaging with said flaring member and having its internal lower end threaded, in combination with a service-pipe connecting member which is adapted to take about said flaring member, the outer surface of said connecting-member being threaded to engage with the internal threads of said union member.

8. A basin-cock provided with a valve and a removable downwardly flaring member within which the valve seats, a service-pipe connecting member adapted to receive the flared end of said flaring member and provided with an annular flange having a circumferential groove, and a union member taking over said flaring member and adapted to engage with the connecting member whereby the relation between the flaring member and connecting member is controlled, said union member being provided with an annular projection adapted to take into the circumferential groove in the flange of the connecting member.

In testimony whereof I have signed my name in presence of two subscribing witnesses.

WILLIAM SYDNEY GRAHAM.

Witnesses:
RUDOLPH WM. LOTZ,
A. FRANCK PHILIPSON.